United States Patent [19]

Ayala-Esquilin et al.

[11] Patent Number: 4,970,098
[45] Date of Patent: Nov. 13, 1990

[54] COATINGS FOR HOT ROLL FUSERS

[75] Inventors: Juan Ayala-Esquilin, San Jose; William H. Dickstein, Morgan Hill; James L. Hedrick, Jr., Santa Clara; John C. Scott, Los Gatos; Arnold C. Yang, San Jose, all of Calif.

[73] Assignee: International Business Machines Corporation, Armonk, N.Y.

[21] Appl. No.: 510,481

[22] Filed: Apr. 18, 1990

[51] Int. Cl.$^5$ .................................................. B32B 9/04
[52] U.S. Cl. .................................. 428/36.4; 428/36.9; 428/402; 428/447; 428/450; 29/132
[58] Field of Search ............... 428/447, 450, 402, 36.4, 428/36.9; 429/132

[56] References Cited

U.S. PATENT DOCUMENTS 4,807,341  2/1989  Nielsen et al. ..................... 428/35.8

Primary Examiner—James Seidleck
Assistant Examiner—Don Sumihiro
Attorney, Agent, or Firm—Joseph G. Walsh

[57] ABSTRACT

A roll for hot fusing having a coating comprising a cross-linked elastomeric random copolymer of dimethylsiloxane and diphenylsiloxane and three additives, (1) from 40 to 55% by weight of small zinc oxide particles, (2) from 5 to 10% by weight of small graphite particles and (3) from 1 to 5% by weight of ceric dioxide particles.

8 Claims, No Drawings

COATINGS FOR HOT ROLL FUSERS

TECHNICAL FIELD

The present invention is concerned with rolls to be used in hot fusing. In particular it is concerned with the formulation for the coating on such rolls to make them both thermally stable and abrasion resistant.

BACKGROUND OF THE ART

U.S. Pat. No. 4,719,130 deals with a toner-fixer roll having an outer layer of a silicone rubber differing most obviously from that of the present invention in that the silicone contains no phenyl groups. The patent teaches the use of thermal stabilizers, and lists ten examples, at col. 3 lines 4–13. Included in this list is "cerium oxide." The thermal stabilizers are said to be useful for the purposes of that patent at 1 to 30 weight percent for the metal oxides. In Example 2, col. 5 line 55, there is shown a formulation which comprises "cerium oxide" in an amount which calculates out to be 0.024 weight percent. The patent is otherwise silent in regard to "cerium oxide," and makes no mention at all of the ceric dioxide which is required in the present invention.

U.S. Pat. No. 4,807,341 deals with a fusing roll having a coating of a copolymer having dimethylsiloxane and from 5 to 15 mole percent diphenylsiloxane recurring units. The patent discloses the use of a mixture of alumina and ferric oxide as a filler to strengthen the polymer.

U.S. Pat. No. 4,702,964 deals with a fixing roll containing a silicone rubber very different from that of the present invention. The patent makes mention of the addition of thermal conductivity increasing agents which may be graphite, metal, iron oxide, zinc oxide, boron nitride and the like, singly or mixed.

U.S. Patent application, Ser. No. 07/145,959, filed Jan. 20, 1988, and assigned to the same assignee as the present application, shows a fuser roller coating which comprises a poly (hydroxyether-diphenyldimethylsiloxane) copolymer. The application also discloses the use of a 56% zinc oxide, 7% graphite filler to improve thermal conductivity and mechanical properties of that elastomer.

Hot roll fusing is used in electrophotographic printing and copying to fix the toner on the paper. At higher printing speeds it is desirable to have the hot roll be softer than the back-up roll. This necessitates the use of a thermally conductive layer on the surface of the heated roll, which is simultaneously elastically deformable and thermally conductive. Many composite elastomer materials which provide these properties have been described in the literature. However, a major problem with all such materials is that they are liable to abrasive wear due to contact with the paper. Thus they have limited life and must be replaced at regular intervals, adding significantly to the maintenance cost of the printer or copier. The present invention describes an elastomer formulation which exhibits significant improvements over previous material combinations.

In designing a hot roll fuser elastomer it is necessary to ensure functional properties of the material, namely compliance, thermal conductivity and toner release characteristics, while at the same time maximizing the lifetime abrasion resistance and thermal stability. Also, it is necessary to ensure that the material is processable into the final device at reasonable cost. The formulation described herein achieves all these objectives in a manner superior to any other described in the literature, or used in the art.

DISCLOSURE OF THE INVENTION

According to the present invention, a coating is provided for hot roll fusers. The coating comprises a cross-linked elastomeric random copolymer of dimethylsiloxane and diphenylsiloxane and three additives. The additives are: (1) From 40 to 55 weight % of zinc oxide particles in the range of 100 to 500 nm diameter, (2) From 5 to 10% by weight of graphite particles with major diameters no greater than 10 microns, and (3) From 1 to 5% by weight of ceric dioxide particles from 0.2 to 3.0 microns in size.

Random copolymers of dimethylsiloxane and diphenylsiloxane have been described in the literature. For the purposes of the present invention, it is preferred that the weight concentration of phenyl be in the range of 20–50%, with the most preferred concentration being 25%. The molecular weight of this resin preferably should be in the range of 10,000 to 30,000 g/mol, and most preferable 20,000 g/mol. The polymer resin is terminated with a vinyl group at each end.

Particulate fillers are used to provide both thermal conductivity and reinforcement of the neat elastomer resin. There is a critical volume fraction of filler above which the abrasion resistance is severly reduced. On the other hand, thermal conductivity and heat capacity are both enhanced by high filler concentration. Therefore it is necessary to find a filler, or combination of fillers, which provide sufficient thermal conductivity and capacity at concentrations low enough that abrasion resistance is not adversely affected.

The siloxane elastomers of the present invention containing more than 55% by weight of zinc oxide exhibit rapid wear. However, even at 55% loading the thermal properties are marginal for use in hot roll fuser systems. Therefore, it is necessary to add a second filler to provide additional thermal conductivity. Graphite is such a material, not only because of high intrinsic thermal conductivity, but also because its platelet morphology results in higher conductivity of the composite than spherical particles at similar weight concentrations. The concentration of this second filler is also dictated to some extent by the effect on wear resistance. Particles of high aspect ratio have lower critical concentrations for rapid increase in wear than spherical particles—around 10% for graphite. This then provides an upper limit on the concentration of the second filler. Graphite also provides additional thermal stabilization of siloxane elastomers. Therefore it is a material of choice in this application.

A key aspect of the present invention is the use of ceric dioxide to assist the degassing of the formulation which, because it contains phenylsiloxane and a high fraction of zinc oxide, is unusually difficult to degas and process without inclusion of bubbles and voids. It is important that any additive be compatible with the rest of the formulation, and not lead to deterioration of the mechanical and thermal properties. Ceric dioxide fulfills all of these requirements. Since $CeO_2$ is not so reinforcing as zinc oxide, it is important that the amount present be kept to a minimum, so that the abrasion resistance is not compromised. We found it necessary to use at least 1% but amounts greater than 5% degrade the properties. 2% is optimal. In addition, ceric dioxide is also acceptable because it is non-toxic and non-volatile. In fact, it seems to be uniquely suitable for this purpose.

In order to form the elastomer layer around the core of the fuser hot roll, a liquid injection molding technique is commonly used and is particularly convenient. This requires that the resin be cured at high temperature with a cross-linking agent, typically by chemical reaction between vinyl groups attached to the siloxane resin and silane groups in the lower molecular weight curing agent. Preferably, the vinyl siloxane moities are at terminal positions in the polymer chains of the base resin. The vinyl-hydride addition reaction is catalyzed by platinum, which may be hindered in its action by complexation with an acetylinic alcohol (e.g. propargyl alcohol) which has a boiling point well above room temperature, but below the preferred temperature for the crosslinking reaction. Air is readily dissolved and trapped in polydimethyldiphenylsiloxane resin, and is therefore difficult or even impossible to remove after the necessary mixing of fillers and curing agent with the base resin. The removal of air can be achieved by the use of a particulate anti-foaming agent, namely ceric dioxide at at least 1% by weight. We find that the addition of 2% ceric dioxide reduces by a factor of five the time necessary to thoroughly degas an uncured batch of mixture. However, ceric dioxide is deleterious to the mechanical properties of the resulting elastomer, and concentrations higher than 5% are undesirable.

Mixing of the fillers and additives into the resin is done using standard techniques, except that special attention must be paid to degassing the mixture. Cross-linking agent is added immediately prior to casting, which also is achieved by standard liquid injection molding techniques onto roll cores primed with a suitable adhesion promoter.

Comparison of samples prepared in this way with other formulations sold for use in hot roll fusers shows significant improvement in mechanical and thermal properties, as shown in the following Table.

TABLE I

| Property | Present Invention | Best Prior Art |
|---|---|---|
| Thermal conductivity (W/m.K) | 0.5 | 0.45 |
| Durometer (Shore A) | 35.0 | 55.0 |
| Taber wear rate (mg/1000 cy) | 70.0 | 80.0 |

The combination of softness, high thermal conductivity and low wear rate are ideal for use in hot-roll fuser application. Previous materials have sacrificed one of these properties at the expense of others; for example, higher thermal conductivity can be achieved by increasing the filler concentration, but this raises the Durometer and increases the wear rate. It is clear that the overall properties of the formulation described herein are superior. Results in an operating machine confirm this.

What is claimed is:

1. A roll for fusing heat softenable toner material to a substrate, said roll comprising a core and an outer covering which comprises a crosslinked elastomeric random copolymer of dimethylsiloxane and diphenylsiloxane, from 40 to 55% by weight of particles of zinc oxide in the range of 100 to 500 nm diameter, from 5 to 10% by weight of graphite particles with major diameters no greater than 10 microns, and from 1 to 5% by weight of ceric dioxide particles from 0.2 to 3.0 microns in size.

2. A roll as claimed in claim 1 wherein the copolymer of dimethylsiloxane and diphenylsiloxane..has a weight concentration of phenyl in the range of from 20 to 50%.

3. A roll as claimed in claim 2 wherein the weight concentration of phenyl is 25%.

4. A roll as claimed in claim 1 wherein the copolymer has a molecular weight in the range of 10,000 to 30,000 g/mol.

5. A roll as claimed in claim 4 wherein the copolymer has a molecular weight of 20,000 g/mol.

6. A roll as claimed in claim 1 wherein the zinc oxide is present at 50% by weight.

7. A roll as claimed in claim 1 wherein the graphite is present at 8% by weight.

8. A roll as claimed in claim 1 wherein the ceric oxide is present at 2% by weight.

* * * * *